(12) United States Patent
Botsch

(10) Patent No.: US 7,467,694 B2
(45) Date of Patent: Dec. 23, 2008

(54) METHOD FOR THE PRODUCTION OF A BRAKE DISK AND BRAKE DISK

(75) Inventor: Siegfried Botsch, Grafenau (DE)

(73) Assignee: Daimler AG, Stuttgart (DE)

( * ) Notice: Subject to any disclaimer, the term of this patent is extended or adjusted under 35 U.S.C. 154(b) by 355 days.

(21) Appl. No.: 10/518,856

(22) PCT Filed: Apr. 29, 2003

(86) PCT No.: PCT/EP03/04439

§ 371 (c)(1),
(2), (4) Date: Jul. 13, 2005

(87) PCT Pub. No.: WO04/000490

PCT Pub. Date: Dec. 31, 2003

(65) Prior Publication Data

US 2006/0175159 A1    Aug. 10, 2006

(30) Foreign Application Priority Data

Jun. 20, 2002    (DE)    ................................ 102 27 529

(51) Int. Cl.
*F16D 65/12* (2006.01)

(52) U.S. Cl. ................................................. 188/218 XL

(58) Field of Classification Search .................. 29/598, 29/888.021; 188/18 A, 17, 218 XL, 26, 264 A, 188/264 AA; 192/107 R See application file for complete search history.

(56) References Cited

U.S. PATENT DOCUMENTS

| | | | | | |
|---|---|---|---|---|---|
| 2,753,959 | A | * | 7/1956 | Johnson | 188/218 XL |
| 3,994,370 | A | * | 11/1976 | Gebhardt et al. | 188/218 XL |
| 4,280,598 | A | * | 7/1981 | Pollinger | 188/218 XL |
| 5,823,303 | A | * | 10/1998 | Schwarz et al. | 188/218 XL |
| 6,158,124 | A | * | 12/2000 | Austin | 29/898.09 |
| 7,040,466 | B2 | * | 5/2006 | Saame et al. | 188/218 XL |
| 2003/0159893 | A1 | * | 8/2003 | Tironi | 188/71.1 |
| 2004/0178030 | A1 | * | 9/2004 | Pacchiana et al. | 188/218 XL |

FOREIGN PATENT DOCUMENTS

| | | |
|---|---|---|
| DE | 43 32 951 | 8/1994 |
| DE | 195 05 112 | 8/1998 |
| DE | 199 31 140 | 2/2000 |
| EP | 1 122 456 | 8/2001 |

\* cited by examiner

*Primary Examiner*—Christopher P Schwartz
(74) *Attorney, Agent, or Firm*—Davidson, Davidson & Kappel, LLC

(57) ABSTRACT

A method for the production of a brake disk and a brake disk which are characterized by the following features: several pairs of bushings inserted into each other are placed into a core box. The core is closed about the bushings in such a way that they form an integral component of the core. The core is inserted into a casting tool and the brake disk is cast. After the core is removed, the brake disk hub and the friction ring are decoupled from each other and can expand in relation to each other without shielding the brake disk.

2 Claims, 2 Drawing Sheets

METHOD FOR THE PRODUCTION OF A BRAKE DISK AND BRAKE DISK

The present invention relates to a method for manufacturing a cast brake disk and to a brake disk made of a cast material.

BACKGROUND

Brake noise and excessive wear in disk brake systems are often attributable to the phenomenon of shielding. Shielding is understood as an axial distortion of the brake disk caused by radial thermal expansion.

Shielding may be reduced considerably by decoupling the friction ring from the brake disk hub. DE 199 31 140 A1, for example, describes the manufacture of a composite cast brake disk made of a hub and a friction ring. A hub is provided in this case with radial retaining bolts and is placed into a casting mold. A casting is then made around the hub in the region of the retaining bolts, and the friction ring is formed. Although in this brake disk there is a separation between hub and friction ring, the radial expansion is limited by the rigid retaining bolts.

DE 195 05 112 A1 describes a method for composite casting for a brake disk. A tooth-shaped metal band is inserted between the hub and friction ring, and a casting is made around the metal band, which is then exposed again. Since the metal band does not bond with the casting, the hub and the friction ring are decoupled after the band is exposed. The disadvantage here is the complicated procedure, and a tight axial fit is difficult to ensure.

SUMMARY OF THE INVENTION

An object of the present invention is to provide a method for manufacturing a brake disk and a brake disk which considerably reduces shielding and which may cost-effectively be suitable for mass production.

According to the method of the present invention, a plurality of pairs of bodies inserted into one another and axially movable with respect to one another are placed in a casting core. The bodies inserted into one another are placed in the casting core in such a way that their axis of movement with respect to the brake disk points largely in a radially outward direction.

The casting core is placed in a casting mold which is filled with liquid metal, preferably a ferrous metal, in the conventional manner. After solidifying, the core is removed and the bodies remain at least partly cast in as joining elements between a friction ring and a brake disk hub.

The brake disk hub and the friction ring are decoupled by the use of the method according to the present invention, whereby shielding is reduced, and they may be manufactured and/or joined via composite casting in a single operation, which considerably reduces production costs. As a rule, no additional joining agent is needed.

In principle, a pre-manufactured single component, such as the brake disk, the brake disk hub, or the friction ring, may be placed in the casting mold and joined during casting via the bodies inserted into one another. One particular advantage of the method is that the brake disk hub and the friction ring are cast and joined in a single casting operation.

The core and the casting mold are shaped such that they are filled together preferably via a gate. After solidifying, a bridge is thus formed between the brake disk hub and friction ring, which is later removed preferably via a machining operation.

A particularly homogeneous and low-shrinkage joint may be achieved using this filling method.

In another embodiment of the method according to the present invention, it is also possible to feed the brake disk hub and the friction ring separately through a branched gate. No bridge requiring subsequent removal is needed in this case; however, the casting procedure is slightly more complex.

The bodies inserted into one another are preferably placed in a core box; core shooting is subsequently performed, the bodies being fixed by the molded and solidified core. This method is easy to automate and is therefore cost-effective.

The present invention further provides a brake disk characterized by the fact that a brake disk hub and a friction ring are joined by two or more pairs of bodies inserted into one another and axially movable with respect to one another. The brake disk hub is joined to one of the two bodies inserted into one another, and the friction ring is joined to the other body. Since the two bodies are axially movable with respect to one another, the brake disk hub and the friction ring may also radially expand with respect to one another. This considerably reduces shielding between the brake disk hub and friction ring. The resulting advantages are lower brake noise, the reduction of brake-pad wear, and the reduction of microcracks in the friction ring caused by shielding. In particular, the reduction in microcracks results in a longer service life of the brake disk.

The bodies inserted into one another are preferably cast between the brake disk hub and the friction ring. The two components are thus firmly joined.

The bodies inserted into one another preferably have a round, particularly preferably circular, cross section. Accordingly their geometric shape is cylindrical, an outer body being designed as a hollow cylinder (bushing) and an inner body also as a hollow cylinder or as a solid cylinder (bolt). Such an arrangement is advantageous for unimpeded mobility of the bodies with respect to one another.

BRIEF DESCRIPTION OF THE DRAWINGS

Advantageous embodiments of the present invention are explained in detail with reference to the figures below and the example.

DETAILED DESCRIPTION

Figure 1:
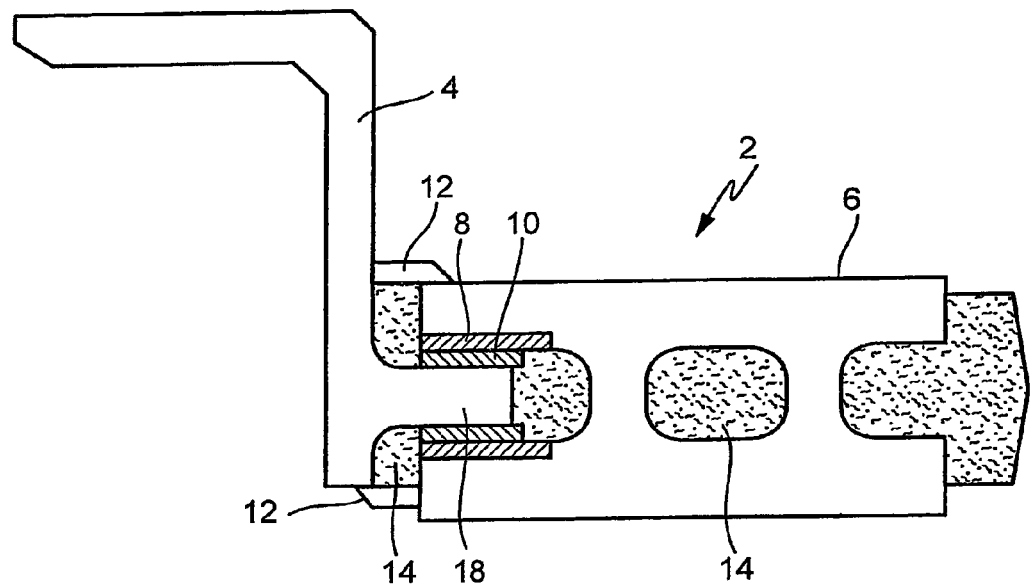
FIG. 1 shows a cross section of a cast brake disk having a core.

Ten pairs of two bodies each inserted into one another in the shape of cylindrical bushing pairs are placed in a core box in an annular shape (8, 10 in FIG. 1). Core sand is shot into the core box and solidified. A solidified casting core (core) encloses bushing pairs 8, 10 in some areas, whereby bushing pairs 8, 10 are fixed in the core and become an integral part thereof.

The core is placed in a casting mold; the brake disk is cast using a method known per se. The metal is cast from a bottom of a friction ring area; the melt flows upward via bridge channels, which form bridges 12 in the cast brake disk, to a hub area. The cast brake disk is then cooled down in a controlled manner.

FIG. 1 shows a cross section of an unfinished brake disk 2 after casting, core 14 being still enclosed by brake disk 2.

Brake disk 2 has a brake disk hub (hub) 4 and a friction ring 6. Hub 4 and friction ring 6 are joined via bridges 12 in this state.

Core 14 is molded in such a way that there is a cavity in inner bushing 10, which is cast out via a stud 18. Stud 18 is firmly joined to inner bushing 10. Friction ring 6 is firmly joined to outer bushing 8.

Figure 2:
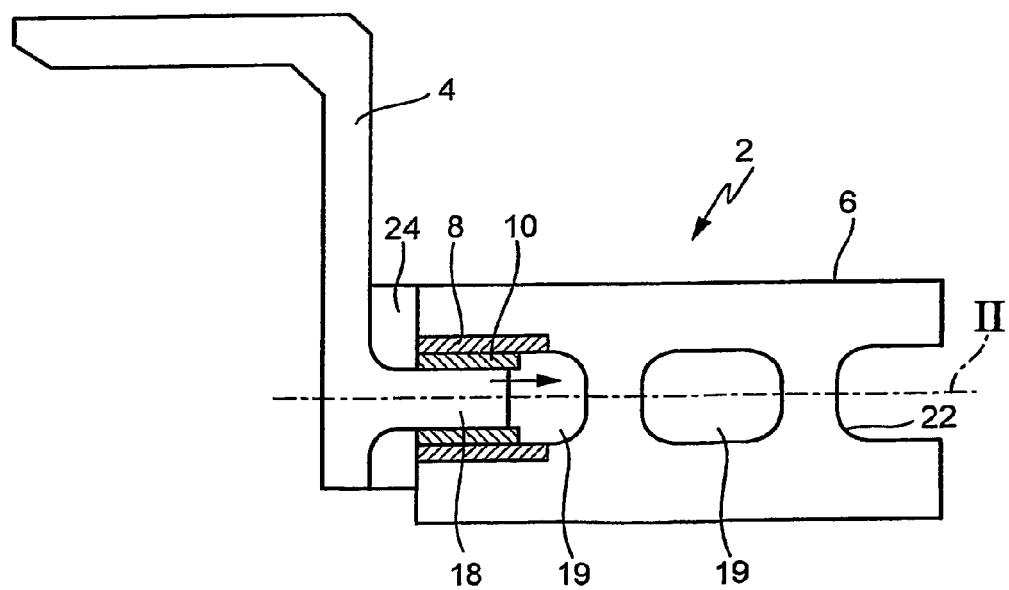
FIG. 2 shows a cross section of a brake disk according to FIG. 1 after machining.

In a subsequent operation, core 14 is removed and bridges 12 are wrung off. FIG. 2 shows finished brake disk 2 from FIG. 1. Hub 4 is now joined to the friction ring only via bushings 8 and 10. Bushings 8 and 10 are axially movable with respect to one another, which allows for radial expansion with respect to hub 4 and friction ring 6 in the direction of the arrow (FIG. 2). When hub 4 and friction ring 6 move radially, a gap 24 is used for equalization and for removing the cooling air conducted by friction ring 6. Open cavities 19 in the center of friction ring 6 form an internal ventilation of brake disk 2.

Figure 3:
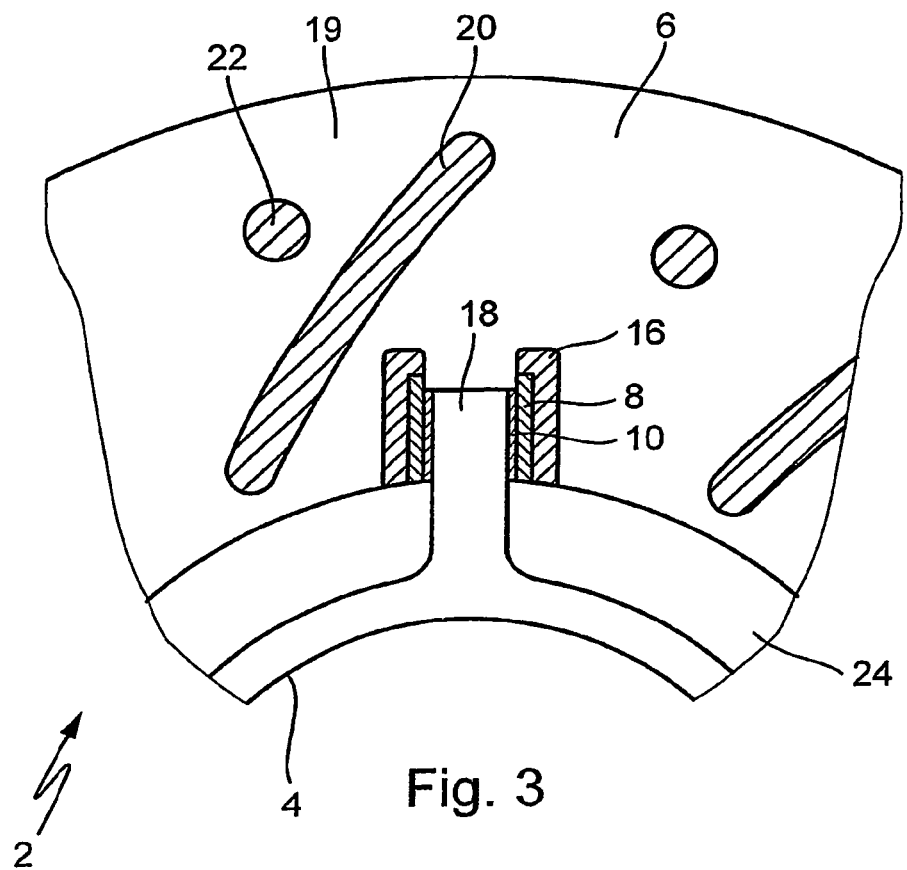
FIG. 3 shows a longitudinal section of a brake disk according to FIG. 2.

FIG. 3 shows a section along line II in FIG. 2. Embodiments for webs 20 or nubs 22 which form cavities 19 of the internal ventilation are shown here as examples. The view of FIG. 2 shows casting 16, via which bushing 8 is cast into friction ring 6. Torque is transmitted from friction ring 6 to hub 4 via cast stud 18.

Figure 4:
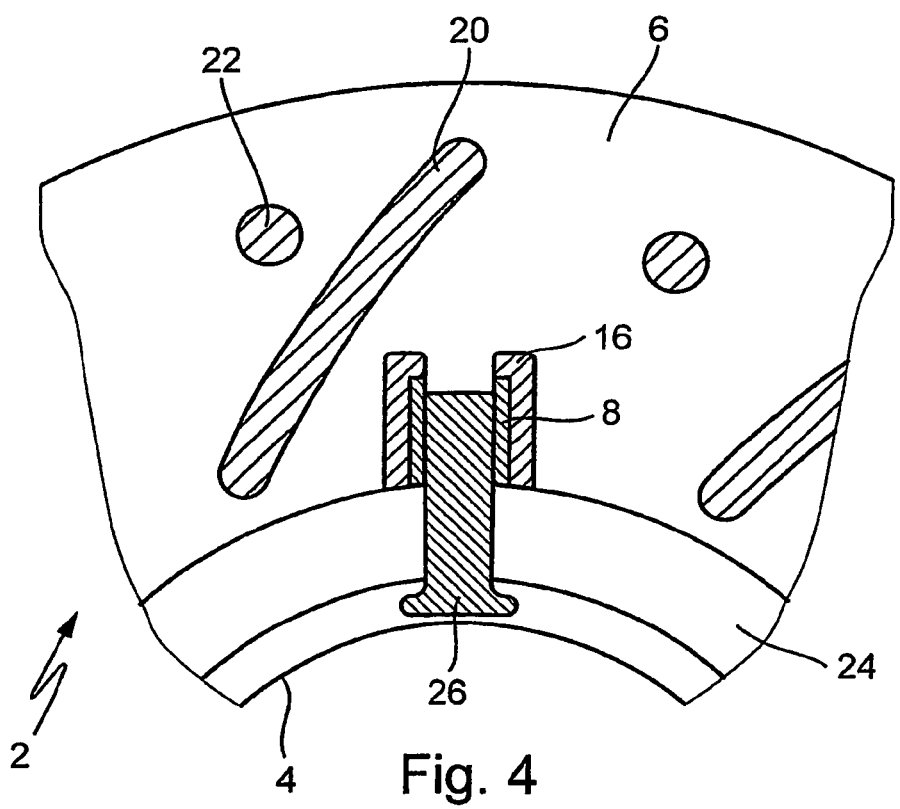
FIG. 4 shows a longitudinal section of a brake disk.

In another embodiment of the present invention according to FIG. 4, the bodies inserted into one another have the form of an external bushing 8 and an internal bolt 26. Bolt 26 is cast in the area of hub 4. Torque is transmitted via bolt 26 as it is via cast stud 18 of FIG. 3.

In the previous example, the bodies inserted into one another are shown having round cross sections. In addition to the round cross section, any other cross section is generally conceivable; however, the cross sections of the bodies should be concentric and should not change along an axis of movement. Furthermore, a rail joint, for example, in the form of a dovetail joint, may be expedient.

The term brake disk hub is normally used for a retaining part which is used for joining the brake disk to a vehicle.

The brake disk is preferably cast using a ferrous metal; therefore, the joining bodies are also preferably made of a ferrous metal. Light metal castings may also be used in the present invention. The individual components of the brake disk may be made of different materials.

The bridges illustrated in FIG. 2 run on an upper and a lower friction ring side, for example. They may be have a circumferential or interrupted design and basically may be situated at any contact point of hub 4 and friction ring 6.

FIGS. 1 through 4 show the arrangement of bodies (8, 10, 26) inserted into one another in such a way that they are essentially situated in the area of the friction ring. In an embodiment which is not illustrated, an outer body of the bodies inserted into one another is surrounded by a cast hub and a joint similar to cast stud 18 in FIG. 3 extends from a friction ring to the hub and is joined there to an inner body of the bodies inserted into one another. A joint similar to bolts 26 in FIG. 4 of the friction ring to the hub is also expedient, the bolt being surrounded by the cast friction ring and being movably mounted in the bushing cast into the hub.

What is claimed is:

1. A method for manufacturing a cast brake disk, the method comprising:
    providing at least two pairs of bodies, each pair including two bodies inserted into one another and movable with respect to one another along an axis of the pair;
    disposing the at least two pair in a casting core such that the respective axis of each pair is substantially radially aligned with respect to the brake disk;
    disposing the casting core in a casting mold;
    filling the casting mold with a liquid metal and cooling so as to provide a solidified cast brake disk by casting the brake disk hub and the friction ring as part of the solidified cast brake disk and joining the brake disk hub and the friction ring using a bridge during the casting;
    removing the core from the solidified cast brake disk, wherein the at least two pair of bodies form joining elements of the cast brake disk between a brake disk hub and a friction ring, a first body of the pair of bodies being directly connected only to the friction ring and a second body of the pair of bodies being directly connected only to the brake disk hub; and
    removing the bridge from the solidified cast brake disk.

2. The method as recited in claim 1, wherein the at least two pair of bodies are disposed in a core box and further comprising shooting a core sand into the core box, the core box being at least partially surrounded by the core.

\* \* \* \* \*